United States Patent
Collins, Jr. et al.

(10) Patent No.: US 8,960,549 B2
(45) Date of Patent: Feb. 24, 2015

(54) METHOD, APPARATUS AND SYSTEM FOR SCANNING AN OPTICAL CODE

(75) Inventors: Donald A. Collins, Jr., Buford, GA (US); David L. Gregerson, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 40 days.

(21) Appl. No.: 13/538,080

(22) Filed: Jun. 29, 2012

(65) Prior Publication Data
US 2014/0001266 A1    Jan. 2, 2014

(51) Int. Cl.
*G06K 7/10*    (2006.01)

(52) U.S. Cl.
USPC ............ 235/462.14; 235/459; 235/383

(58) Field of Classification Search
USPC ............... 235/379, 381, 382, 383, 459, 439, 235/462.13, 462.14
See application file for complete search history.

(56) References Cited

U.S. PATENT DOCUMENTS

| | | | |
|---|---|---|---|
| 3,807,129 A * | 4/1974 | Freidel et al. | 53/571 |
| 4,178,671 A * | 12/1979 | Luttig | 29/429 |
| 5,426,282 A * | 6/1995 | Humble | 235/383 |
| 5,491,328 A | 2/1996 | Rando | |
| 5,770,848 A * | 6/1998 | Oizumi et al. | 235/462.14 |
| 6,286,758 B1 | 9/2001 | Dejaeger et al. | |
| 6,558,720 B1 * | 5/2003 | Karner | 426/231 |
| 2006/0278708 A1 * | 12/2006 | Olmstead | 235/454 |
| 2012/0138687 A1 | 6/2012 | Baitz | |
| 2012/0205448 A1 * | 8/2012 | Hoskinson et al. | 235/440 |
| 2012/0223141 A1 * | 9/2012 | Good et al. | 235/455 |

* cited by examiner

*Primary Examiner* — Sonji Johnson
(74) *Attorney, Agent, or Firm* — Harden E. Stevens, III; Paul W. Martin

(57) ABSTRACT

A method, apparatus and system are presented for improving a point of sale terminal by reducing the number of items a cashier must pick up and move for scanning during a purchase transaction. The point of sale terminal includes an optical code scanner that identifies an item by reading an optical code (barcode) affixed to or printed on the item. The scanner further includes a weigh scale that weighs items being scanned and a conveyor belt that moves the items across the scanner during the weighing and scanning operations. Moving the items using the conveyor belt reduces the number of items the cashier must pick up and move.

8 Claims, 7 Drawing Sheets

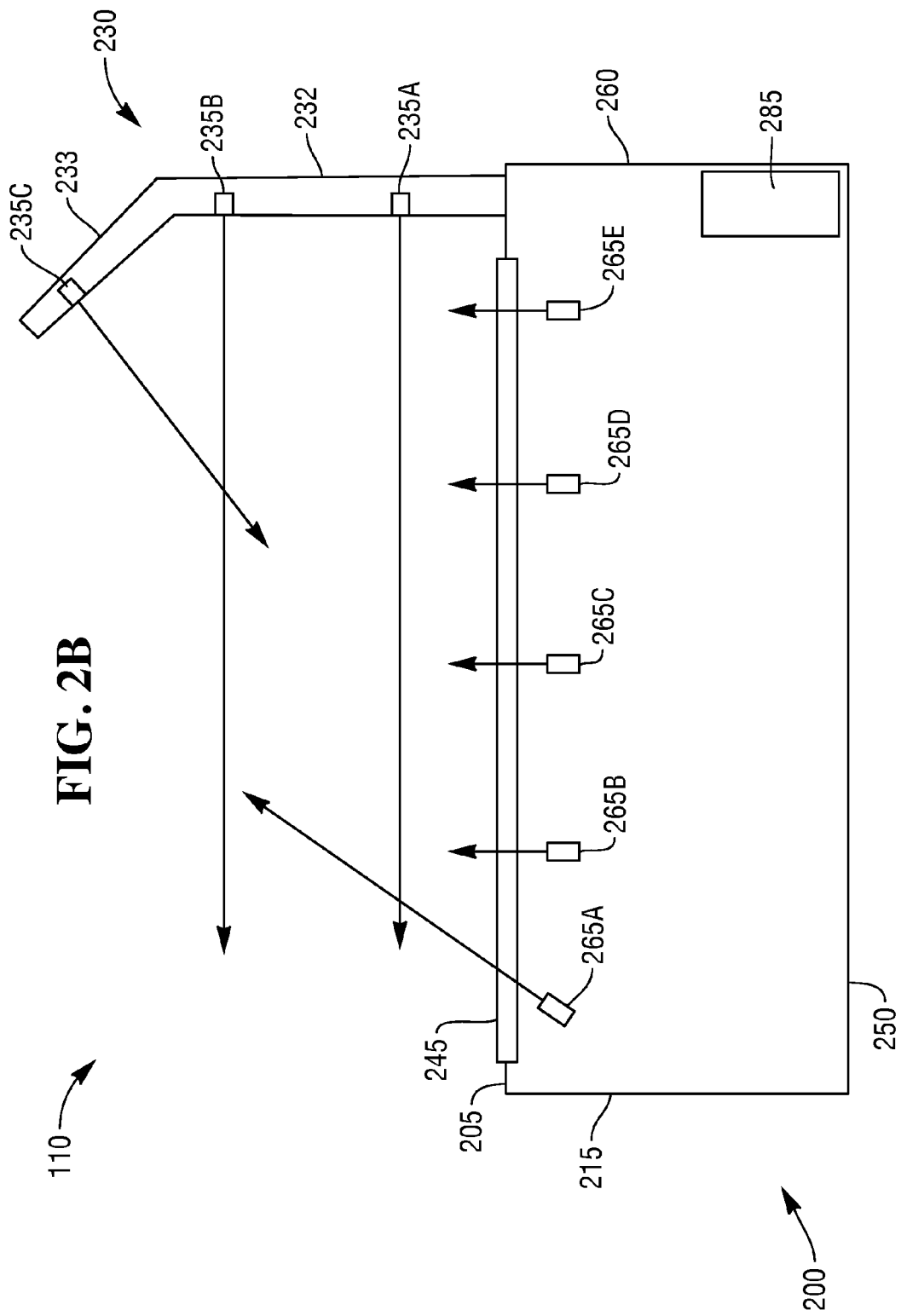

METHOD, APPARATUS AND SYSTEM FOR SCANNING AN OPTICAL CODE

FIELD OF THE INVENTION

The present invention relates generally to improvements to optical code scanning. More particularly, but not exclusively, it relates to improvements to an optical code scanner, system and method.

BACKGROUND

Any discussion of prior art throughout the specification should in no way be considered as an admission that such prior art is widely known or forms part of common general knowledge in the field.

An assisted point of sale (POS) terminal is a POS terminal operated by a cashier. Customers present items for purchase and the cashier identifies each item by moving the item across an optical code scanner which reads an optical code in the form of a barcode attached to or printed on the item. The cashier is required to pick up and scan most of the items in the customer's purchase transaction.

Recent statistical data shows that a cashier picks up and scans an average of 550 items per hour and moves each item across a one foot wide optical code scanner. Over a one year period, a cashier will, on average, move a total of 77 tons of merchandise through a total distance of 292 miles. This is one factor that leads to job dissatisfaction and high turnover rates for cashiers. Thus, among its several aspects, the present invention recognizes there is a need to change how items are scanned so that a cashier does not have to pickup and scan most of the items comprising a purchase transaction.

SUMMARY OF THE INVENTION

Among its several aspects, the present invention seeks to overcome or ameliorate at least one of the disadvantages of the prior art, or to provide a useful alternative.

Among its several aspects, one embodiment of the present invention recognizes a condition where a cashier of a point of sale terminal must pick up and move a large number of items over a period of time that in aggregate weigh many tons. This physical requirement lowers the cashier's job satisfaction and is one factor in the high turn over rate for cashiers. One aspect of the present invention provides a conveyor belt integrated into an optical code scanner that moves items across or through the field of view of the optical code scanner. This reduces the number of items that a cashier must pickup and move for scanning.

In accordance with an embodiment of the present invention, there is provided an optical code scanner for use in a point of sale terminal to read barcodes and weigh items presented for purchase. To this end, a scanner may suitably comprise: a base housing including a top surface wherein the top surface includes a first aperture; a weigh scale located within the base housing; and a conveyor belt disposed within the first aperture and configured to move items from the receiving side of the base housing to the opposite side of the base housing and wherein the conveyor belt is attached to the weigh scale in a configuration that allows the weigh scale to determine the weight of any item on the conveyor belt.

The scanner may further suitably comprise: an upper housing mounted to the rear and side of the top surface and extending vertically above the top surface; an imaging optical code scanner including a first plurality of image capture devices disposed within the upper housing and configured to have fields of view directed across the top surface of the base housing; and wherein the conveyor belt is operable to receive an item from one side of the base housing and move the item through the field of view of at least one of the plurality of image capture devices and wherein the imaging optical code scanner is operable to capture an image of a bar code on the item and decode the bar code and wherein the weigh scale is operable to determine the weight of the item on the conveyor belt.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the Drawings and the Detailed Description. The Drawings are not necessarily drawn to scale. Throughout the Drawings, like element numbers are used to describe the same parts throughout the various drawings, figures and charts.

FIG. 2B is a high-level cross section diagram illustrating selected internal components of the optical code scanner/weigh scale.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible and envisioned.

As used herein, the term optical code includes machine-readable indicia that includes, but are not limited to, one-dimensional (1D) barcodes and two-dimensional (2D) barcodes.

Figure 1:
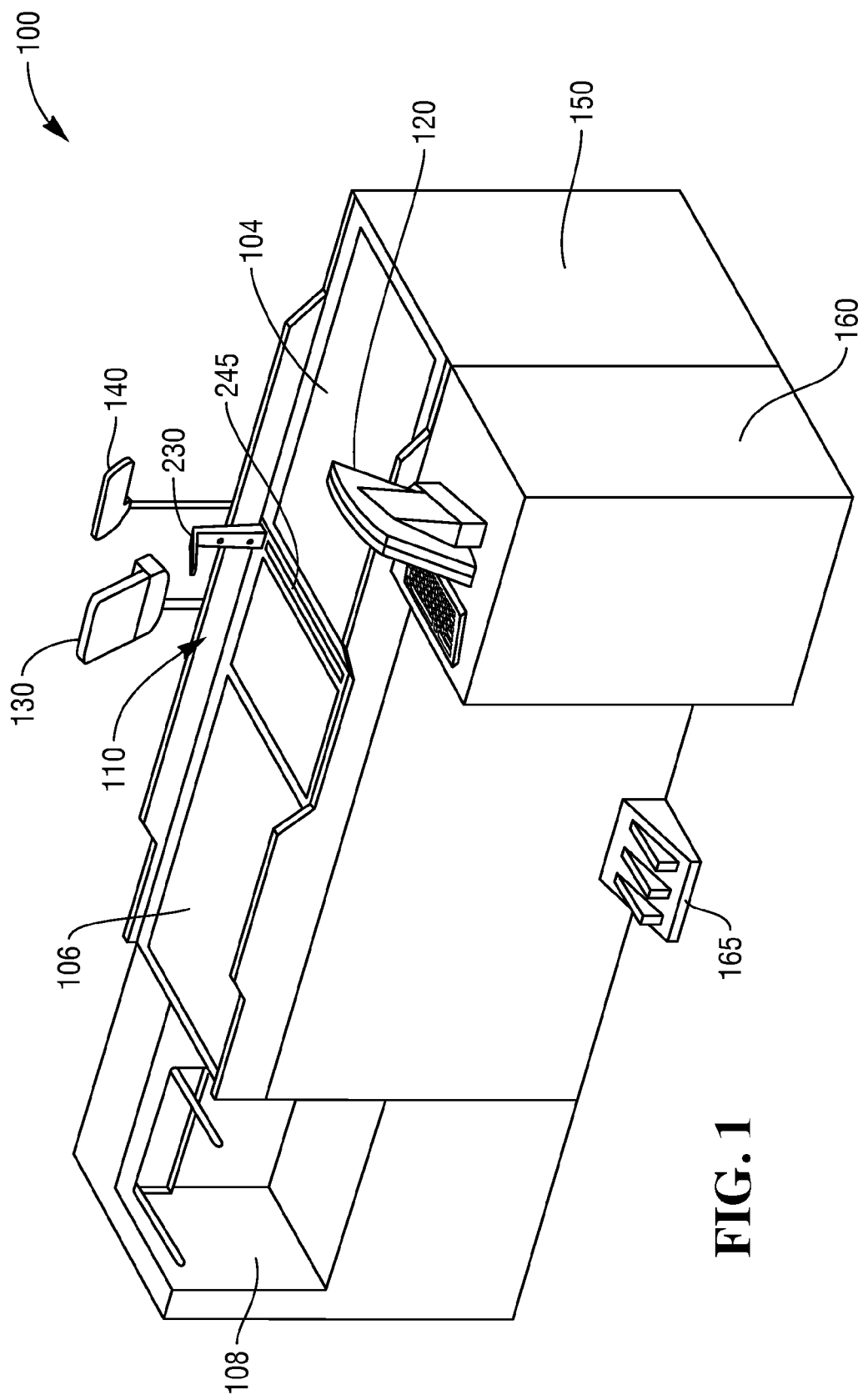
FIG. 1 is a high-level drawing illustrating an exemplary embodiment of a point of sale terminal system.

Referring now to FIG. 1, there is provided a high-level drawing illustrating an exemplary embodiment of a point of sale terminal system 100 ("POS terminal"). The POS terminal 100 includes a main housing 150, a computer housing 160 and a bag well 108. The main housing 150 includes an input conveyor belt 104, an optical code scanner/weigh scale 110 ("scanner") and a take away conveyor belt 106. A magnetic stripe card reader 130 and a customer display 140 are attached to the main housing 150. The scanner 110 fits in a standard 12" wide by 20" long opening in the main housing 150. Also shown as part of the scanner 110 is an upper housing 230 and a second aperture 245 which are discussed in more detail below. The computer housing 160 is attached to the main housing 150 and houses a computer unit (FIG. 3, 300) and further supports a cashier display and keyboard 120 on its top surface.

A foot pedal device 165 is attached to the main housing 150. In some embodiments, the foot pedal device 165 can be moved by a cashier to provide the best ease of use. The pedals on the foot pedal device 165 provide a user interface that allows the cashier to start, stop and reverse the direction of each conveyor belt controlled by the foot pedal device 165. In some embodiments, the foot pedal device 165 is replaced by cashier operated switches and sensors that determine the presence of an item on a conveyor belt.

The POS terminal 100 is designed to operate as an assisted terminal. A trained cashier operates the terminal 100 and stands on the near side of the POS terminal 100 next to foot pedal device 165. A customer wishing to purchase one or more items approaches the POS terminal 100 on the far side of the POS terminal 100 next to the input conveyor belt 104. The customer places the one or more items for purchase on the input conveyor belt 104 which transports each item to the scanner 110. As described in more detail below, the scanner 110: receives items from the input conveyor belt 104; scans each item by moving the item across the top of the scanner using a conveyor belt FIG. 2A, 225; and delivers each item to the take away belt 106. As an item moves across the scanner 110, the scanner 110 identifies the item using a barcode on the item and determines the weigh of the item if necessary. The take away conveyor belt 106 receives items from the scanner 110 and transports them to the bag well 108 for bagging.

The cashier uses the foot pedal device 165 to control all the conveyor belts on the POS terminal 100. In some embodiments, a processor using sensors tracks the movement of items on the conveyor belts and controls the movement of each conveyor belt relieving the cashier of most of the responsibility for controlling the conveyor belts. The customer display 140 displays details of the purchase transaction to the customer and the cashier display 120 displays details of the purchase transaction to the cashier. The magnetic stripe card reader 130 is used by the customer to read a credit or a debit card as one form of payment.

Figure 2A:
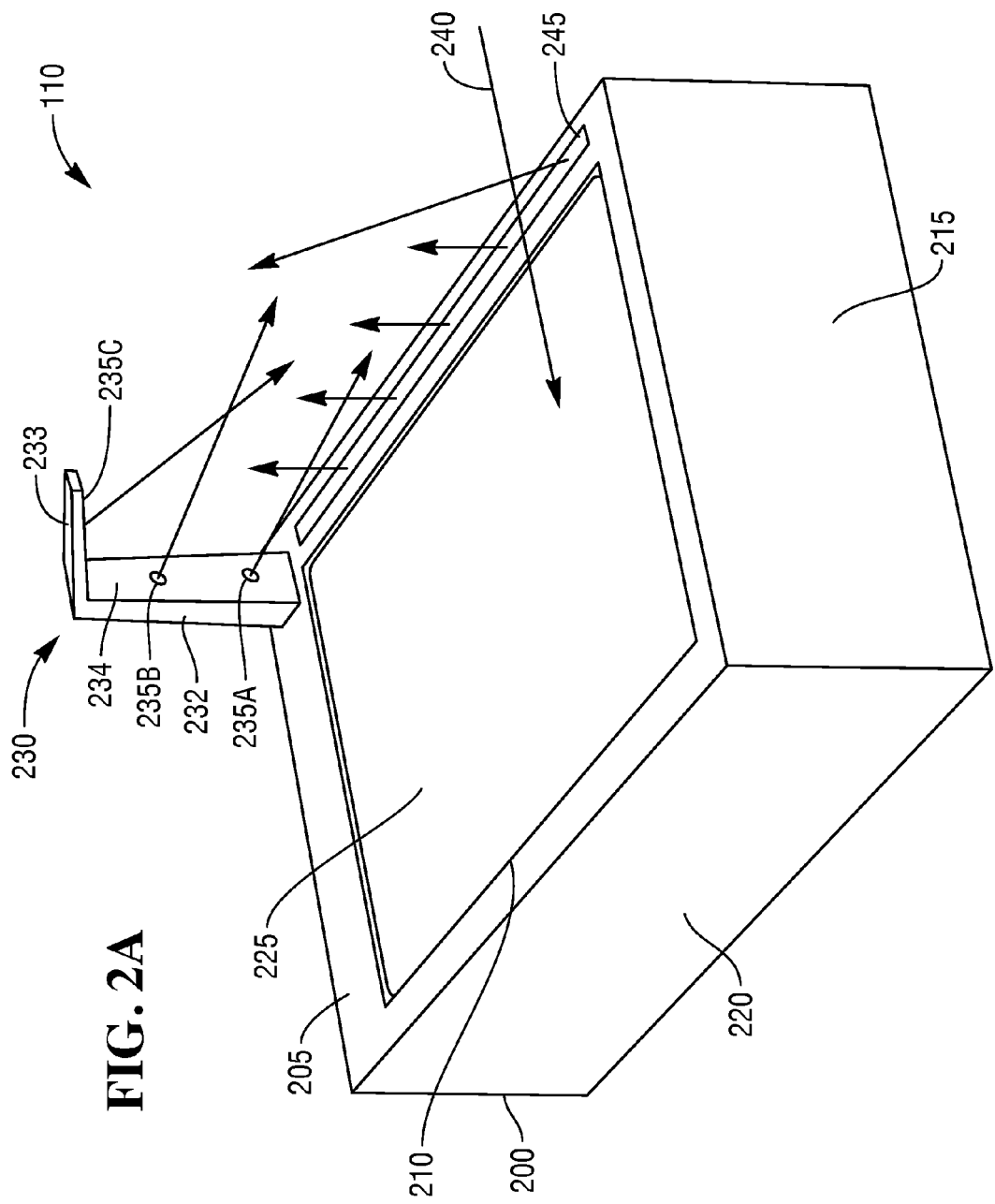
FIG. 2A is a high-level drawing illustrating an exemplary embodiment of an optical code scanner/weigh scale.
Figure 2C:
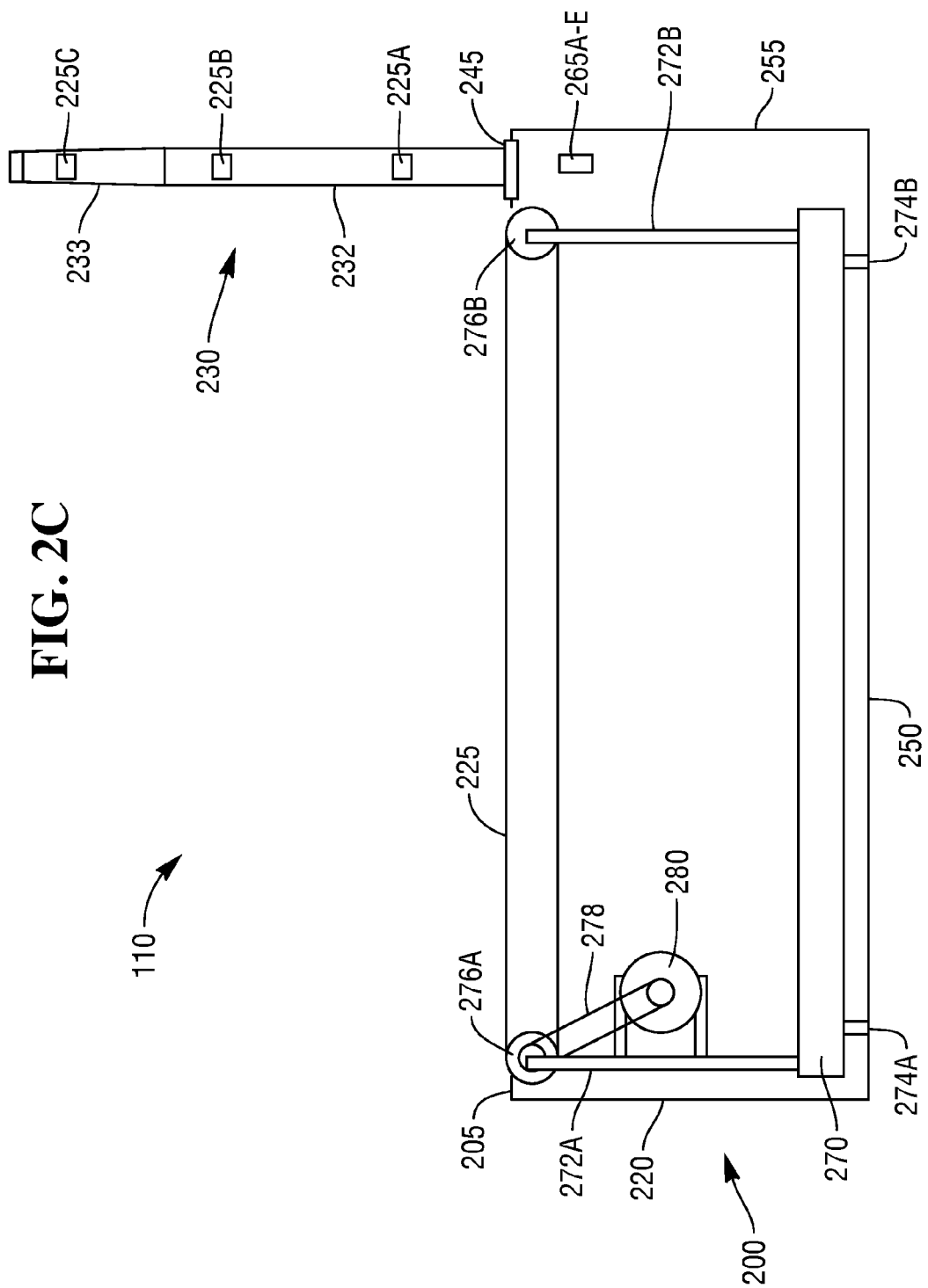
FIG. 2C is another high-level cross section diagram illustrating selected internal components of the optical code scanner/weigh scale.

FIG. 2A is a high-level drawing illustrating an exemplary embodiment of the optical code scanner/weigh scale 110. The scanner 110 includes a base housing 200 and an upper housing 230. The base housing 200 has six sides. FIG. 2A depicts a front side 215, a left side 220 and a top side 205. The other sides are depicted in FIG. 2B and FIG. 2C. The top side or surface 205 includes first aperture 210 and the second aperture 245. The second aperture 245 is long and narrow and is located proximate to the right edge of the top side 205. The second aperture 245 is filled with an optically clear material to create a window through the top side 205. Tempered float glass and sapphire on glass are examples of materials that can be used to fabricate the window.

The first aperture 210 encompasses a significant portion of the top side 205. The conveyor belt 225 is located within and substantially fills the first aperture 210. The top of the conveyor belt 225 is flush with the top side 205. The conveyor belt 225 is designed to move items from one side of the scanner 110 to the other side of the scanner 110. In this example, items are received on the right side and moved to the left side as depicted by an arrow 240. The movement of the conveyor belt 225 can be reversed or stopped and the conveyor belt 225 has variable speeds. The left edge of the first aperture 210 is located proximate to the left edge of the top left side 220 to minimize the distance between the left edge of the first aperture 210 and the left edge of the top left side 220.

The upper housing 230 is attached to the top side 205 near the rear of the right edge of the top side 205. The height of the upper housing 230 above the top side 205 is generally less than two (2) feet. The actual height can vary depending on the size of items the system is designed to scan. In this embodiment, the upper housing 230 includes a first portion 232 that extends vertically from the top side 205 to a second portion 233. The second portion 233 extends upward at an angle from the vertical and generally out above a rear section of the second aperture 245. The first portion 232 includes a first image capture device 235A and a second image capture device 235B. The second portion 233 includes a third image capture device 235C. The image capture devices 235A-C are operable to capture images from their respective fields of view. Each image capture device comprises a CMOS image sensor to capture images. Other embodiments include additional or fewer image capture devices in different configurations.

The viewing areas of the image capture devices 235A-C are generally directed toward the second aperture 245 or to an area above the second aperture 245. The arrows extending from each image capture device represent the general viewing direction of each image capture device 235A-C. In some embodiments, illumination devices (not shown) are included in the upper housing 230 and the main housing 200. In some embodiments, additional image capture devices are located below the second aperture 245 and designed to capture images through the second aperture 245. Their viewing areas are depicted by the arrows extending up through the second aperture 245.

FIG. 2B is a cross sectional view of the scanner 110 from the right side illustrating selected internal components. Located below the second aperture 245 are five image capture devices 265A-E. They are configured to capture images through the second aperture 245 as depicted. The front most image capture device 265A, is aimed upward and toward the rear of the scanner 110 to receive and capture images of the sides of items passing through the scanner 110. The other image capture devices 265B-E are aimed upward to receive and capture images of the bottom sides of items passing through the scanner 110. The arrows extending from each image capture device and depicts the general direction of the viewing area for each device.

In addition to image capture devices 265A-E, light sources (not shown) are located below the second aperture 245 and configured to direct light through the second aperture 245 to illuminate items passing across the scanner 110. The main housing 200 further includes a bottom side 250, a rear side 260 and a computer unit 285 that controls the scanner 110.

FIG. 2C is another cross sectional view of the scanner 110 from the front side 215 illustrating selected internal components. A weigh scale 270 is located within the main housing 200 and mounted to the bottom side 250. Two of the mounting attachments 274A-B are shown. Also, within the main housing 200 is the conveyer belt 225 which fills most of the first aperture 210. The conveyer belt 225 wraps around a drive pulley 276A and a tail pulley 276B. The pulleys 276A-B extend from the front of the main housing 200 to the rear of the main housing 200. Both the drive pulley 276A and tail pulley 276B are mounted to the weigh scale 270. The front end of the drive pulley 276A is fixed to an attachment 272A that is fixed to the weigh scale 270. The rear end of the drive pulley 276A is mounted to the weight scale 270 using a similar attachment (not shown). An electric motor 280 is mounted to the attachment 272A. The motor 280 drives the conveyor belt 225 using a drive belt 278 that connects the motor 280 to the drive pulley 276A. The motor 280 has variable speeds and can reverse directions. The front end of the tail pulley 276B is fixed to a second attachment 272B that is fixed to the weigh scale 270. The rear end of the tail pulley 276B is mounted to the weigh scale 270 using a similar attachment (not shown).

All the components of the conveyor system are mounted to the weigh scale 270. To provide accurate weights for items on the conveyor belt 225, the components of the conveyor system is isolated from the main housing 200. The weight of the conveyor system is known and subtracted from any weight measured by the weigh scale 270. The remaining weight is the weight of whatever is resting on the conveyor belt 225.

In this embodiment, items moved from right to left across the scanner 110. However, in other embodiments, items moved from left to right by moving the upper housing 230 and second aperture 245 from the right side to the left side and shifting the first aperture 210 proximate to the right side 255.

Figure 3:
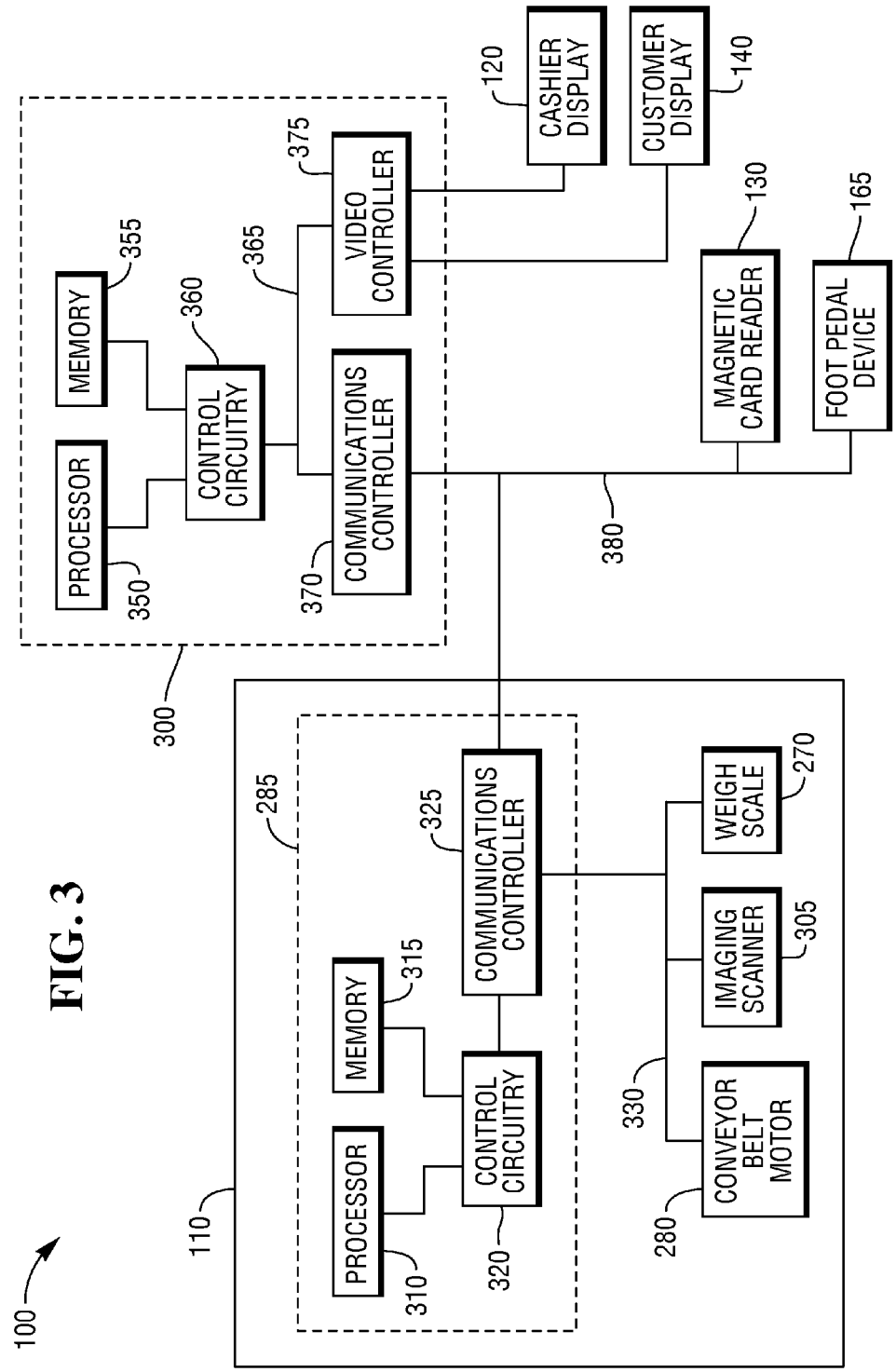
FIG. 3 is a high-level block diagram illustrating selected components of the point of sale terminal.

Turning to FIG. 3, there is provided a high-level block diagram illustrating selected components of the point of sale terminal 100. The computer unit 300 is located in the computer housing 160 of the POS terminal 100. The computer unit 300 includes a processor 350, a memory 355, control circuitry 360, a communications controller 370 and a video controller 375. The memory 355 includes both volatile and non-volatile memory. The non-volatile memory may include flash memory or other types of solid state electronic memory. Software stored in the memory 355 is executed by the processor 350 and causes the processor 350 to control the devices attached to the POS terminal 100 and to create the features and functions performed by the POS terminal 100. The control circuitry 360 provides an interface between the processor 350 and the memory 355 and between the processor 350 and a computer bus 365 used to control the communications controller 370 and the video controller 375.

The communications controller 370 includes hardware and software required to communicate with external devices and peripherals over a computer peripheral network 380. In some embodiments, the computer peripheral network 380 is implemented using the industry standard Universal Serial Bus (USB). In other embodiments, the computer peripheral network 380 may include wired or wireless communications links or both. The scanner 110, the magnetic card reader 130 and the foot pedal device 165 are connected to the computer peripheral network 380. The video controller 375 controls the information displayed on the cashier display 120 and the customer display 140.

The foot pedal device 165 has a number of pedals that are used by the cashier to control the three conveyor belts on the POS terminal 100. The cashier can start, stop and reverse the conveyor belts using the pedals. When the cashier activates a pedal that controls the conveyor belt 225 on the scanner 110, the processor 350 of the POS terminal 100 receives the request from the foot pedal device 165 and sends a command to the scanner 110 over the computer peripheral network 380. The command causes the processor 310 to implement the request from the foot pedal. The request can be to start, stop or reverse the conveyor belt 225. In some embodiments, the input conveyor belt 104 and the take away conveyor belt 106 are controlled by switches on the main housing 150 and sensors are used to start and stop the conveyor belts when items are detected on the belts. In these embodiments, the foot pedal device 165 only controls the conveyor belt 225 in the scanner 110 so the foot pedal device 165 is connected to and controlled by the scanner 110 instead of the processor 350 of the POS terminal 100.

The scanner 110 includes the computer unit 285. The computer unit 285 includes a processor 310, a memory 315, control circuitry 320 and a communications controller 325. The memory 315 includes both volatile and non-volatile memory. The non-volatile memory may include flash memory or other types of solid state electronic memory. Software stored in the memory 315 is executed by the processor 310 and causes the processor 310 to control the devices attached to the scanner 110 and to create the features and functions performed by the scanner 110. The control circuitry 320 provides an interface between the processor 310 and the memory 315 and between the processor 310 and the communications controller 325.

The communications controller 325 includes hardware and software required to communicate with external devices and peripherals over the first computer peripheral network 380 and a second computer peripheral network 330. In some embodiments, the two computer peripheral networks 380, 330 are implemented using the industry standard Universal Serial Bus (USB). In other embodiments, the computer peripheral networks 380,330 may include wired or wireless communications links or both.

The scanner 110 uses the second computer peripheral network 330 to control the conveyor belt motor 280, the imaging scanner 305 and the weigh scale 270. The conveyer belt motor 280 is controlled by the processor 310 and can be operated at different speeds and in a forward and a reverse direction. The forward direction moves items from the right side to the left side of the scanner 100. Unless otherwise stated, when the conveyor belt 225 is started, it is moving in the forward direction. The imaging scanner 305 includes all the image capture devices 265A-E, 225A-C and any illumination devices. The imaging scanner 305 captures images using the image capture devices 265A-E, 225A-C and processes the images to identify and decode optical codes. The imaging scanner 305 is controlled by the processor 310. In some embodiment, the processor 310 processes the captured images and decodes the optical code. In other embodiments, the imaging scanner 305 includes a separate processor that processes the captured images and decodes the optical code. The weigh scale 270 is controlled by the processor 310 and is used to determine the weight of an item on the conveyor belt 225.

When an item is received by the scanner 110 and identified as an item that is sold by weight, the scanner 110 moves the item to the middle of the scanner 110 and stops the conveyor belt 225. The weight of the item is determined by the weigh scale 270. The scanner 110 sends the weight to the POS terminal 100 and starts the conveyor belt 225 to move the item to the take away belt 106. An item sold by weight can be automatically identified by a barcode attached to the item and scanned by the scanner 110 or by using a manual process where the cashier identifies the item and instruct the POS terminal 100 to have the scanner 110 weigh it.

When an item passes through the scanning area of the scanner 110 and is not identified, the scanner 110 will cause the conveyor belt 225 to reverse direction until the item is moved back into the scanning area to attempt to rescan the item for identification. If the second attempt to identify the item fails, a message will be displayed on the cashier display 120 requesting that the cashier identify the item. In some embodiments, the scanner 110 also sends the POS terminal 100 a command to stop the input conveyor belt 104 when the scanner 110 attempts to rescan an item. When the item is identified, the scanner 110 sends a command to the POS terminal 100 to start the input conveyor belt 104. In some embodiments, the number of rescans is a software parameter and can be set to a plurality of the different values by an administrator of the POS terminal 100.

Figure 4A:
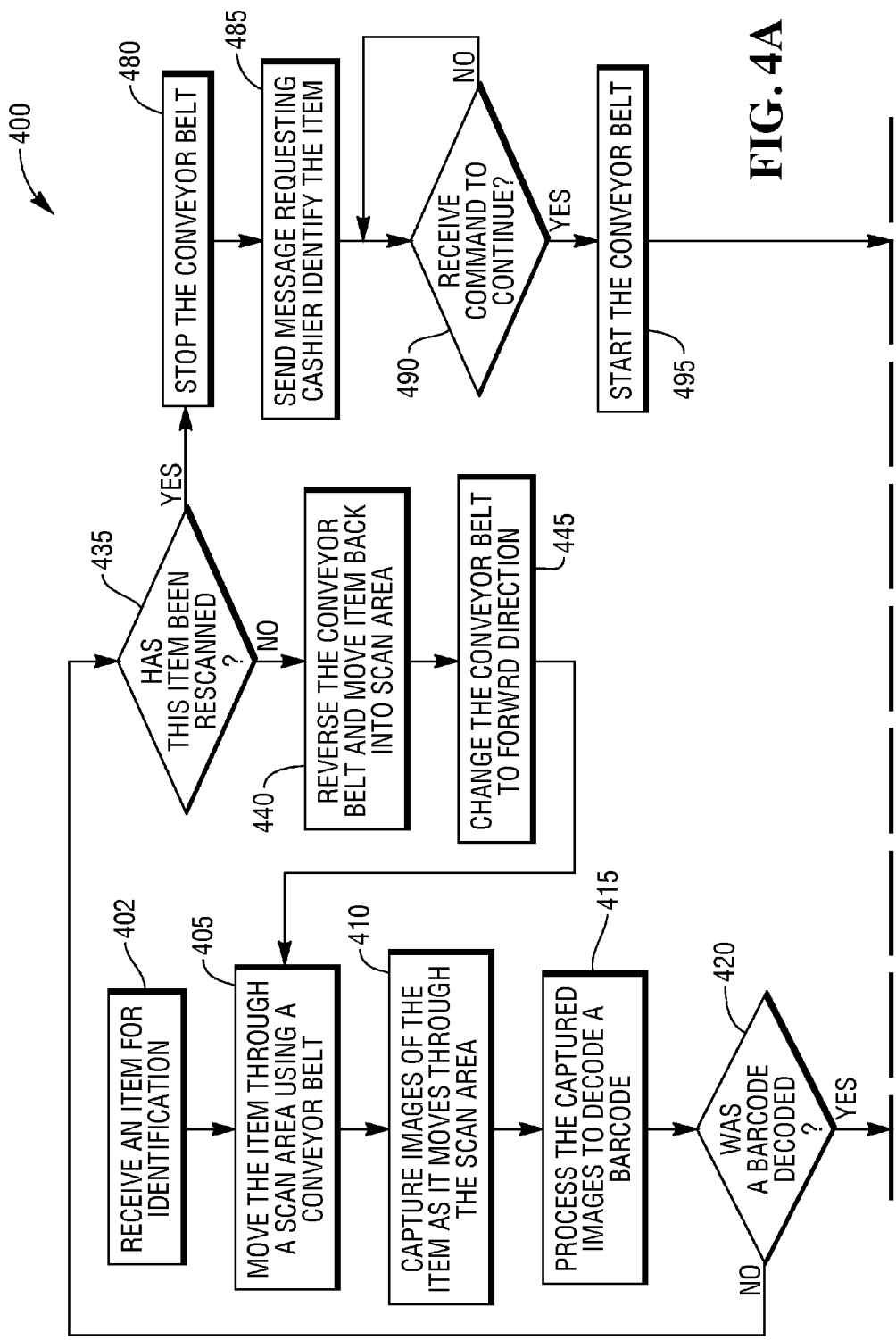
FIG. 4 is a high-level flow chart illustrating an exemplary method for operating the optical code scanner/weigh scale.
Figure 4B:
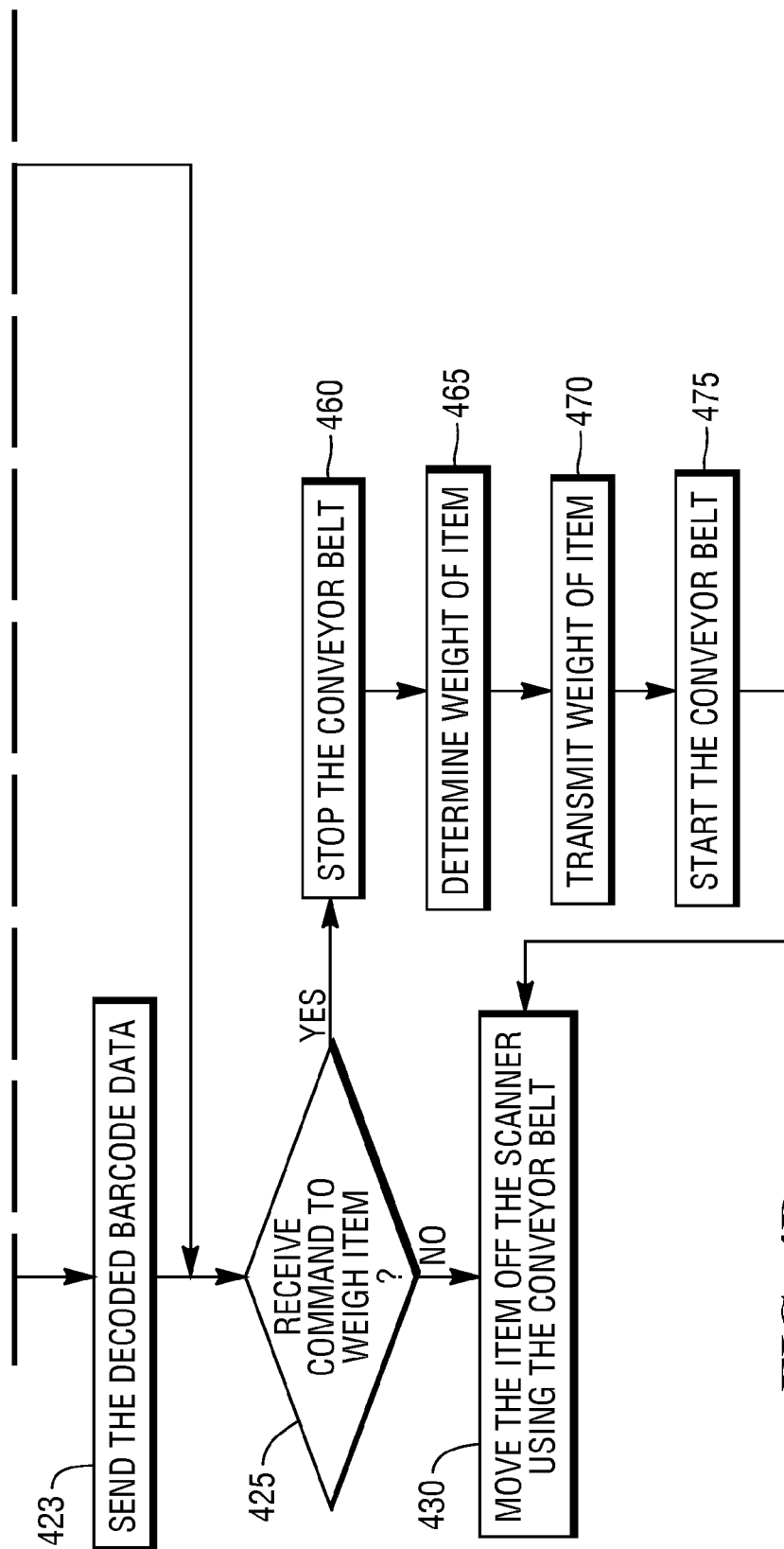

FIG. 4 is a high-level flow chart illustrating an exemplary method 400 of operating the scanner 110. At step 402, an item is received for identification by the scanner 110. In the POS terminal system 100, the item is delivered to the scanner 110 by the input conveyor belt 104. At step 405, the item is moved through the scan area using the conveyor belt 225 in the scanner 110. As the item moves off the input conveyor belt 104, it moves onto the scanner's 110 conveyor belt 225. The scan area comprises the general area between the two conveyor belts 225,104 and an area over the right end of the conveyor belt 225. The second aperture 245 is located on the top side 205 of the scanner 110 in the area between the two conveyor belts 225, 104. The area between the input conveyor belt 104 and the conveyor belt 225 on the scanner 110 is relatively small. Thus, the input conveyor belt 104 pushes average sized items across the area and partially onto the scanner's 110 conveyor belt 225. The partial contact with the conveyor belt 225 is sufficient in most cases for the item to be captured by the conveyor belt 225 and moved across the scanner 110. In some cases, the cashier may have to nudge the item onto the conveyor belt 225 but this is still an improvement of over picking up each item.

At step 410, images of the item are captured by image capture devices 235A-C located in the upper housing 230 and by image capture devices 265A-E located under the second aperture 245. At step 415, the captured images are processed to decode data for any barcode that was captured.

Step 420 determines if a barcode was found and the data decoded. If a barcode was decoded, the method continues to step 423. If a barcode was not decoded, the method continues to step 435. At step 423, the decoded barcode data is transmitted to the POS terminal 100 over the computer peripheral network 380. At step 425, it is determined if a command has been received to weigh the item. The POS terminal 100 determines if the identified item is sold by weight and must be weighed. Therefore, the POS terminal must send a command that causes the scanner 110 to weigh the item if it is sold by weight. If a weigh command has been received, control is transferred to step 460. If no command has been received, the method continues at step 430. At step 430, the item moved off the scanner 110 using the conveyor belt 225. In some embodiments, the item is moved onto the take away belt 106 which delivers the item to the bag well 108.

The following section of the method 400 weighs the item on the conveyor belt 225. At step 460, the conveyor belt 225 is stopped. This removes any vibrations that might prevent an accurate weight reading. At step 465, the weight of the item is determined by the weigh scale 270. The weight of the item is determined by taking the weight of the item and all the elements mounted on the weigh scale 270 and subtracting the known weight of all the elements mounted on the weigh scale 270. At step 470, the weight of the item is transmitted to the POS terminal 100 over the computer peripheral network 380. At step 475, the conveyor belt 225 is started and control is transferred to step 430.

The following section of the method 400 is used to rescan an item that was not scanned on the first try. The method 400 allows an item to be rescanned once. However, other embodiments permit additional rescans as a software selectable option. At step 435, it is determined if the item has been rescanned and the rescanned failed. If it has, control passes to step 480. If the item has not been rescanned, control passes to step 440. At step 440, the direction of the conveyor belt 225 is reversed which moves the item back into the scan area. At step 445, the direction of the conveyor belt 225 is changed back to the forward direction. In some embodiments, sensors are used to determine when an item is in the scan area. In other embodiments, one or more of the image capture devices are used to capture images that are processed to determine the location of the item and when it is the scan area. Control then passes to step 405 where more images are captured in an attempt to read a barcode on the item.

The following section of the method 400 is used when a rescan of the item failed to read a barcode. At step 480, the conveyor belt 225 is stopped with the item still on it. At step 485, a message is sent for display on the cashier display 120. The message requests that the cashier identify the item on the conveyor belt 225. The message is transmitted on the computer peripheral network 380 to the POS terminal 100. At step 490, it is determined if a command to continue has been received. The cashier enters the identification for the item using the cashier keyboard 120 which it connected to the POS terminal's 100 processor 350. Before the scanner 110 can continue scanning items, the POS terminal's 100 processor 350 must send a continue command to the scanner 110. If the command has not been received, control passes back to step 490. If the command has been received, control passes to step 495. At step 495, the conveyor belt 495 is started in the forward direction and control passes to step 425.

Although particular reference has been made to an embodiment that includes an assisted service point of sale terminal that includes an optical code scanner with an integrated conveyor belt and weigh scale and examples have been provided illustrating the invention, certain other embodiments, variations and modifications are also envisioned within the spirit and scope of the following claims. For example, there are embodiments where the point of sale terminal is a self-service terminal and the operation of the scanner is fully automated.

We claim:

1. An optical code scanner comprising:
   a base housing including
      an item receiving side;
      an opposite side from the item receiving side;
      a top surface having a first aperture adjacent the item receiving side and containing an image capture device for capturing an image of an item from at least one direction, and a second aperture adjacent the opposite side and containing a scanner conveyor belt;
      an upper housing mounted adjacent to one side of the first aperture and extending vertically above the top surface; and
      another image capture device disposed within the upper housing for capturing another image of the item from at least another direction different than the one direction; and
   wherein the scanner conveyor belt transports the item from the first aperture to the opposite side when the item overlaps the first and second apertures.

2. The optical code scanner of claim 1, further comprising:
   a weigh scale located within the base housing, wherein the scanner conveyor belt is attached to the weigh scale in a configuration that allows the weigh scale to determine the weight of the item on the scanner conveyor belt.

3. An optical code scanner for use in a point of sale terminal to read barcodes and weigh items presented for purchase, the optical code reader comprising:
   a base housing including
      an item receiving side;
      an opposite side from the item receiving side;
      a top surface having a first aperture adjacent the item receiving side and containing an optically transparent material and a first plurality of image capture devices below the optically transparent material, and a second aperture adjacent the opposite side and containing a scanner conveyor belt;
   wherein the first plurality of image capture devices are configured to capture first images of the items through the optically transparent material when the items are adjacent the first aperture, wherein the first plurality of image capture devices have fields of view that start at the top surface of the optically transparent material and extend upward from the first aperture and substantially transverse to the transport direction;

wherein the scanner conveyor belt transports the items from the first aperture to the opposite side when the items overlap the first and second apertures;

a weigh scale located within the base housing, wherein the scanner conveyor belt is attached to the weigh scale in a configuration that allows the weigh scale to determine the weight of any of the items on the scanner conveyor belt;

an upper housing mounted adjacent to one side of the first aperture and extending vertically above the top surface; and a second plurality of image capture devices disposed within the upper housing and configured to capture second images of the items and to have second fields of view directed across the top surface of the base housing and transverse to the transport direction, wherein the first and second fields of view overlap to form a scan area for scanning the items.

4. The optical code reader of claim 3, wherein the conveyor belt is configured to start, stop, change direction of movement and change speed of movement.

5. The scanner of claim 4, further comprising a foot pedal device configured to provide input that causes the conveyor belt to start, stop and change direction.

6. The scanner of claim 5, wherein the first plurality of image capture devices are arranged in a row within the first aperture.

7. A scanning method comprising:

establishing a scan area by a first plurality of image capture devices in a first aperture in a top surface of a scanner and adjacent an item receiving side of the scanner, and establishing the scan area by a second plurality of image capture devices in an upper housing mounted adjacent to one side of the first aperture and extending vertically above the top surface of the scanner; and receiving the item at the scan area from an input conveyor belt adjacent the item receiving side of the scanner; and transporting the item away from the scan area by a scanner conveyor belt within a second aperture of the top surface of the scanner when the item overlaps the first and second apertures.

8. The scanning method of claim 7, further comprising:

weighing the item while the item is on the scanner conveyor by a weigh scale located within the scanner, wherein the scanner conveyor belt is attached to the weigh scale.

* * * * *